Feb. 22, 1938.  A. G. BLANCHARD  2,109,348
ILLUMINATED BOILER WATER LEVEL GAUGE
Filed Aug. 3, 1936
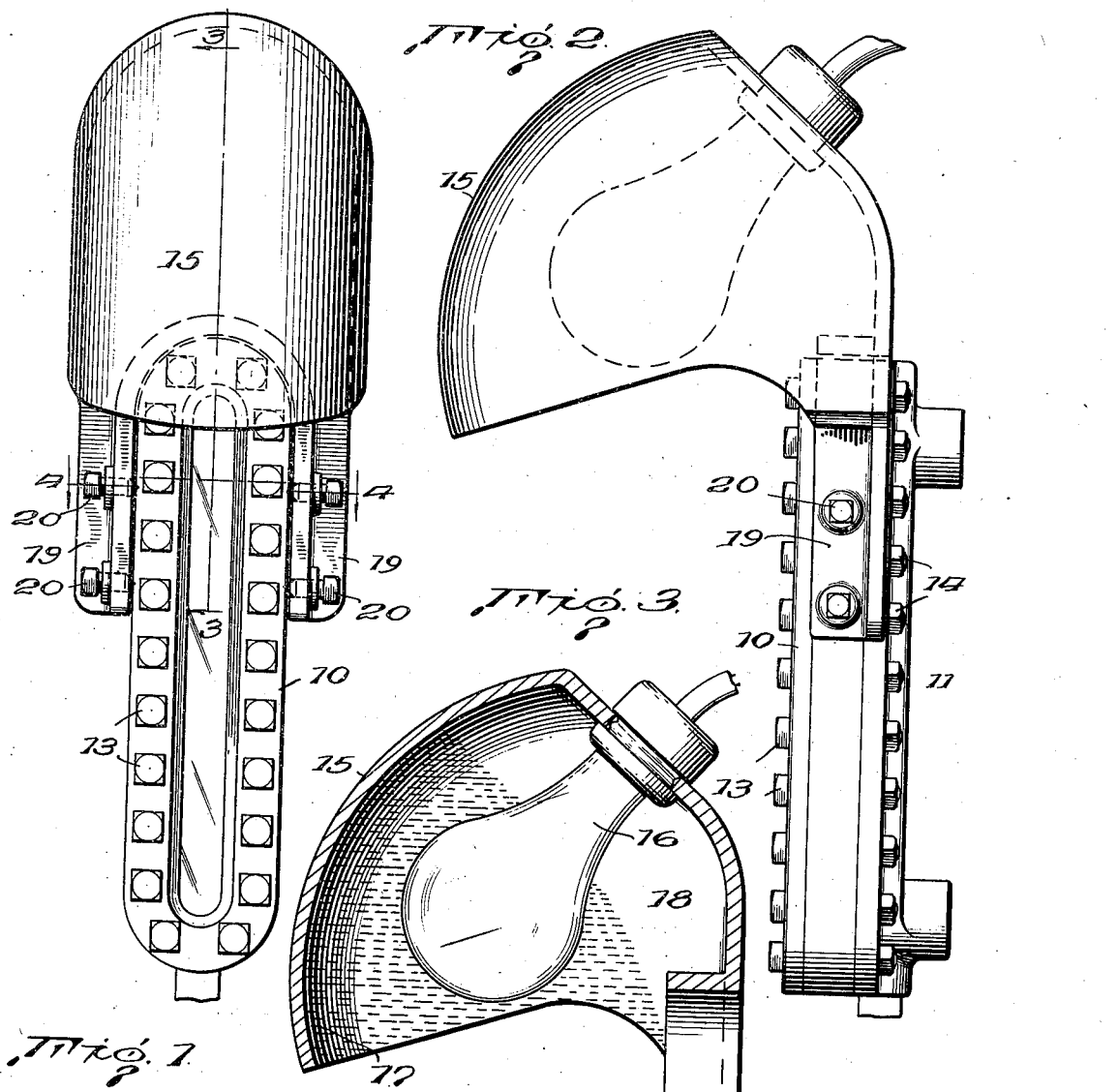
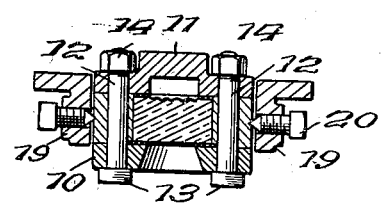
Inventor
Alva G. Blanchard,
By Church & Church
His Attorneys Patented Feb. 22, 1938

2,109,348

UNITED STATES PATENT OFFICE 2,109,348

ILLUMINATED BOILER WATER LEVEL GAUGE

Alva G. Blanchard, Shreveport, La.

Application August 3, 1936, Serial No. 94,079

1 Claim. (Cl. 73—293)

This invention relates to improvements in illuminating means for indicating instruments such as boiler water level gauges.

One object of the invention is to provide more efficient illumination of such instruments, so as to render them more easily and accurately readable by the attendant.

A further object of the invention is to combine the illuminating means and gauge to form a substantially unitary structure but still permit the source of light and its reflector, which illuminates the gauge, to be adjusted relatively to the gauge proper.

Still another object of the invention is to provide a gauge amply illuminated, but which will be devoid of surfaces such as will cause a glare in the attendant's eyes when reading the gauge.

With these and other objects in view the invention consists in certain details of construction and combinations and arrangements of parts, all as will hereinafter be more fully described and the novel features thereof particularly pointed out in the appended claim.

In the accompanying drawing—

Figure 1 is a front elevation illustrating the present gauge with its illuminating devices assembled therewith;

Fig. 2 is a side elevational view of the structure shown in Fig. 1;

Fig. 3 is a transverse cross-section of the reflector on the line 3—3 of Fig. 1; and Fig. 4 is a vertical sectional view on the line 4—4 of Fig. 1, through the reflector.

The present invention is primarily intended for use in connection with boilers utilized in the drilling of oil wells, which boilers are, in practically all instances, unhoused or out of doors and are adapted to be only temporarily used in one location and then moved to new locations from time to time. Ordinarily, only a few weeks, or at most a few months, are required for the drilling of an oil well, the time depending largely upon the depth of the well and, as a result, it is not normally considered economic to enclose the boilers within a room or other protected working area, such as a permanent power plant. In most instances the boilers are simply mounted upon the ground at a reasonable distance from the well. Lights are strung upon the well derrick for illuminating the derrick, the machinery at the derrick and the surrounding vicinity, and usually only one or two additional lights are placed at haphazard locations, as determined by the rigging-up crew, to light the entire vicinity of the whole battery of boilers, with no local lighting being provided for the boiler gauges. If a light should be hung directly in front of a gauge, it is usually used for the general illumination of the surrounding vicinity also and, for this reason, is not provided with a shade to protect the eyes of the attendant from the glare, nor to direct the light rays upon the gauge itself, so as to facilitate ready and accurate reading of the gauge. Also, since it is quite important that the gauges be plainly visible, the present apparatus has been devised to insure both a sufficient amount of light at the gauge and properly direct it upon the face of the gauge, a shade or screen being provided to prevent glare in the operator's eyes, such as might interfere with accuracy in the reading of the gauge. For these reasons, the present invention contemplates a water level gauge having a source of light and a reflector for the light directly mounted upon the gauge, the several elements constituting substantially an integral structure.

As shown in the accompanying drawing, the gauge casing is formed of front and rear sections 10 and 11, firmly secured together by a plurality of bolts 12 formed with integral heads 13 at the front of the gauge and with threaded extremities for reception of the nuts 14 at the rear of the gauge casing. Directly mounted on the gauge casing and projecting above the same is a hood-like reflector 15, within which is mounted a source of light 16, an ordinary electric bulb being illustrated in the present instance. This hood-like reflector projects forwardly of the gauge and its forward portion extends downwardly somewhat so as to conceal the light to the extent that the attendant will not be annoyed by rays of light direct from the source of light so long as his eyes are not below the horizontal plane in which is located the forward lower edge of the reflector. Thus, all glare by direct rays is eliminated. To further minimize or protect the eyes of the attendant from glare, only the forward portion of the interior of the reflector is provided with a highly reflective surface, as indicated at 17, the rear portion of the interior of the reflector 18 being provided with a non-reflecting surface as, for instance, by being painted black. In this connection, it should also be pointed out that the bolts 12 are assembled in the gauge with their permanent heads at the front of the gauge. This permits the front surface of the gauge, together with the headed ends of the bolts, to be painted black or any other suitable color, such as will not tend to reflect the rays of light into the attendant's eyes. In other words, if the threaded ends of the bolts were at the front of the casing, those ends, and the nuts threaded thereon, could not be painted, as it may hinder or prevent removal of the nuts, should their removal be desirable at any time. It will be appreciated, of course, that a boiler water level gauge must necessarily be mounted at the same height as the water level inside the boiler, this level usually being near the top of the boiler. Therefore, the height of the gauge from the ground, or from the floor, will depend largely upon the size of the boiler. Also, the height of the gauge relatively to the eyes of the boiler attendant will depend upon other conditions in connection with the lay-out of the particular job on which the boiler is employed. That is, it will depend somewhat upon the height of the floor or walk-way upon which the attendant stands when reading the gauges. It will also depend, to a certain degree, upon the height of the operator himself. For these reasons, the present instrument is so constructed that while it is a substantially unitary device, nevertheless the reflector is capable of adjustment vertically with respect to the gauge proper. For this reason, the reflector is provided with a bifurcated portion forming two arms 19 adapted to embrace the side surfaces of the gauge casing. Threaded in the arms 19 are set screws 20, by means of which the reflector may be clamped on the gauge casing. By loosening and re-tightening these screws 20, the hood-like reflector may be set at any desired height relatively to the gauge itself, so that the attendant may adjust it as he finds most convenient, i. e., neither so high that the rays of light from the electric bulb within the hood will shine directly in his eyes, nor so low that the lower edge of the hood will cover any part of the water-filled portion of the gauge which should at all times be exposed to full view.

With this arrangement, it will be apparent that the gauge will be amply illuminated to facilitate accurate reading of the gauge at night. At the same time, the attendant will not be annoyed by any glare caused by the light used in illuminating the gauge. Also, and what is very important, the gauge and its illuminating instrumentalities constitute substantially a unitary structure, while, at the same time, the reflector and source of light may be adjusted relatively to the gauge to compensate for any variance in conditions, under which the gauge is used.

What I claim is:

The combination of a gauge casing, a reflector and a source of light carried within and partially concealed by the reflector, said reflector having a bifurcated extension, the arms of said bifurcated portion slidably engaging the opposite side surfaces of said gauge casing, and means releasably locking said arms on said casing.

ALVA G. BLANCHARD.